United States Patent
Doh

(10) Patent No.: US 6,793,606 B2
(45) Date of Patent: Sep. 21, 2004

(54) SHIFT CONTROL METHOD FOR SHIFTING AN AUTOMATIC TRANSMISSION TO A FORWARD DRIVING RANGE WHILE DRIVING IN A REVERSE DRIVING RANGE

(75) Inventor: Gyu-Chull Doh, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/991,731

(22) Filed: Nov. 26, 2001

(65) Prior Publication Data

US 2002/0082139 A1 Jun. 27, 2002

(30) Foreign Application Priority Data

Dec. 26, 2000 (KR) ........................................ 2000-81824

(51) Int. Cl.[7] .............................................. B60K 41/04
(52) U.S. Cl. ...................................... 477/115; 477/902
(58) Field of Search ................................ 477/902–905, 477/115, 116, 118, 122, 123; 701/64

(56) References Cited

U.S. PATENT DOCUMENTS

| | | | | |
|---|---|---|---|---|
| 4,768,636 A | * | 9/1988 | Ito et al. ........................ | 477/71 |
| 5,224,398 A | * | 7/1993 | Sasaki ......................... | 475/123 |
| 5,733,220 A | * | 3/1998 | Iizuka ......................... | 477/116 |
| 5,743,826 A | * | 4/1998 | Usuki et al. .................... | 477/98 |
| 5,772,550 A | * | 6/1998 | Kamada et al. ............. | 475/120 |
| 5,792,023 A | * | 8/1998 | Bazzi et al. ................. | 477/116 |
| 6,325,742 B1 | * | 12/2001 | Lee ............................. | 477/116 |
| 6,464,617 B1 | * | 10/2002 | Lee ............................. | 477/154 |

FOREIGN PATENT DOCUMENTS

| | | |
|---|---|---|
| DE | 44 20 930 C2 | 12/1995 |
| DE | 198 52 292 A1 | 5/2000 |
| JP | 10-078117 | 3/1998 |
| JP | 11-037273 | 2/1999 |
| JP | 11-159609 | 6/1999 |
| KR | 61-31747 A | 2/1986 |

* cited by examiner

*Primary Examiner*—Tisha D Lewis
(74) *Attorney, Agent, or Firm*—Birch, Stewart, Kolasch & Birch, LLP

(57) ABSTRACT

An automotive transmission shift controller to reduce a shift shock occurring while shifting from a reverse driving range to a forward driving range, and to improve durability at the same time.

The controller detects a shift lever position, an engine revolution speed, a throttle valve opening, and a speed of the vehicle, and performing a shift control operation for shifting into a first gear if the shift lever is changed from a reverse driving range to a forward driving range and the engine revolution state is an idling state, and if the detected throttle valve opening and the vehicle speed respectively are not more than predetermined values.

6 Claims, 2 Drawing Sheets

SHIFT CONTROL METHOD FOR SHIFTING AN AUTOMATIC TRANSMISSION TO A FORWARD DRIVING RANGE WHILE DRIVING IN A REVERSE DRIVING RANGE

CROSS-REFERENCE TO RELATED APPLICATION

This application claims priority of Korea patent Application No. 2000-81824, filed on Dec. 26, 2000.

BACKGROUND OF THE INVENTION (a) Field of the Invention

The present invention relates to an automatic transmission of a vehicle, and more particularly, it relates to a control method for shifting from a reverse driving range to a forward driving range of an automatic transmission of a vehicle.

(b) Description of the Related Art

Generally, in an automatic transmission used for a vehicle, a control device performs control to realize automatic shifting into different speeds and shift ranges according to selection of a shift lever position, vehicle speed and the like. Conventionally, when a shift lever is positioned at a neutral range, a driver changes the shift lever to a reverse driving range and depresses an accelerator pedal to reverse the vehicle. Then, if the driver wants to proceed forward again, he would reduce the vehicle speed or stop the vehicle by using a brake system, change the shift lever from the reverse driving range to a forward driving range, depress the accelerator pedal, and drive the vehicle in the forward driving state.

A shift control of prior art performs shifting into a first gear or a second gear of the forward driving range on the basis of a vehicle speed of driving in the reverse driving range, when the shift lever is suddenly shifted into the forward driving range while driving in the reverse driving range.

However, in the case of an extremely low vehicle speed, a shifting mechanism (TCU) misrecognizes shifting from R (reverse driving range) →D (forward driving range) as shifting at a stop-state because a vehicle speed signal is not inputted, and performs a shifting into an unwanted gear.

For this reason, the shift control of prior art does not perform appropriate shifting along the entire vehicle speed range. More specifically, shift shock occurs if a vehicle is shifted into range D while driving in range R.

SUMMARY OF THE INVENTION

It is an objective of the present invention to provide a shift control method for shifting into a forward driving range while driving in a reverse driving range of an automatic transmission vehicle for reducing shift shock that occurs in changing a shift lever from a reverse driving range to a forward driving range, and to improve durability at the same time.

To achieve the above objective, the present invention provides a shift control method for shifting into a forward driving range while driving in a reverse driving range of an automatic transmission vehicle, wherein the method comprises detecting a shift lever position, an engine revolution speed, a throttle valve opening, and a speed of the vehicle, and performing a shift control operation for shifting into a first gear if the shift lever is changed from a reverse driving range to a forward driving range and the engine revolution state is an idling state, and if the detected throttle valve opening and the vehicle speed respectively are not more than predetermined values.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings. While this invention is described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Figure 1:
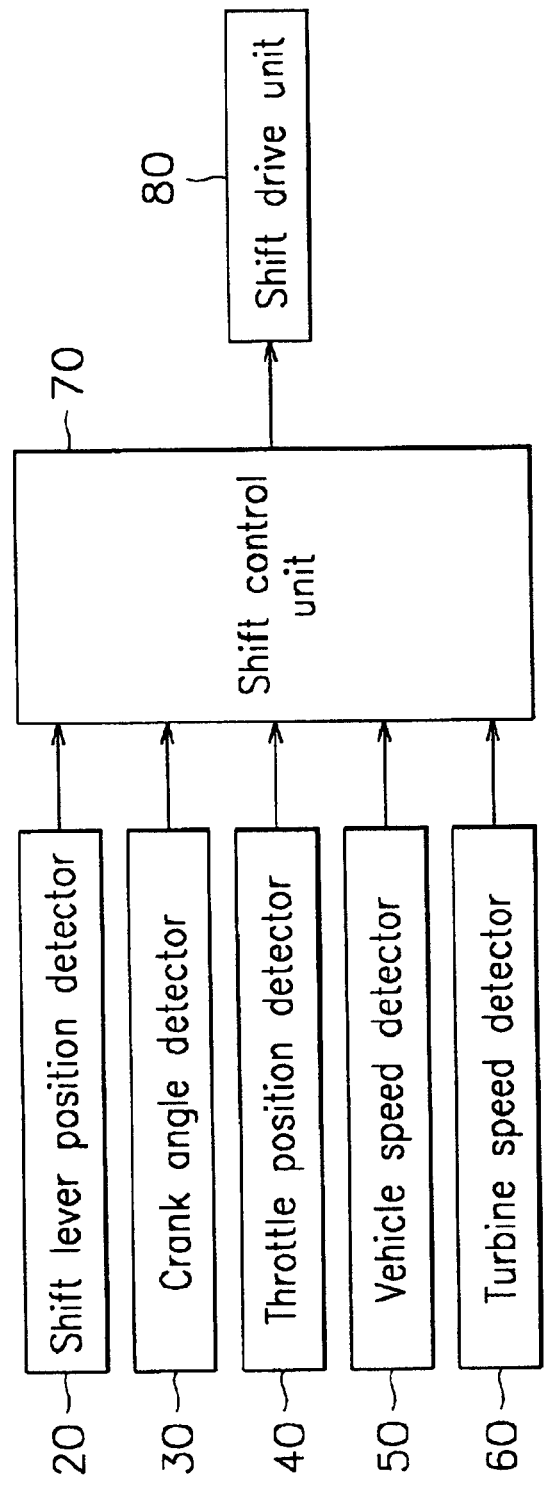
FIG. 1 is a block diagram of a shift control method for shifting into a forward driving range while driving in a reverse driving range of an automatic transmission vehicle according to a preferred embodiment of the present invention.

FIG. 1 is a block diagram of a shift control method for shifting into a forward driving range while driving in a reverse driving range of an automatic transmission vehicle according to a preferred embodiment of the present invention.

As shown in FIG. 1, a shift control device for shifting into a forward driving range while driving in a reverse driving range of an automatic transmission vehicle according to a preferred embodiment of the present invention includes a vehicle speed detector (Output shaft RPM, no RPM) 50 detecting the vehicle speed, a shift lever position detector 20 detecting the shift lever position of the vehicle, a crank angle detector 30 detecting the engine revolution speed of the vehicle, and a throttle position detector 40 detecting the throttle valve opening of the vehicle.

The device also includes a shift control unit 70 generating a drive control signal for shifting into a first gear based on the throttle valve opening and vehicle speed being not more than predetermined values, after detecting the throttle valve opening and vehicle speed when the shift lever is changed from the reverse driving range (range R) to the forward driving range (range D) and an engine revolution state is an idling state, and a shift drive unit 80 performing the predetermined shift control operation by controlling hydraulic pressure when it receives the drive control signal for shifting into the first gear from the shift control unit 70.

The shift control device for shifting into a forward driving range while driving in a reverse driving range of an automatic transmission vehicle according to a preferred embodiment of the present invention further includes a turbine speed detector 60 generating a predetermined control signal by detecting a turbine revolution speed of a torque converter of the vehicle.

With the above structure, the shift control unit 70 sends a drive control signal for shifting into a first gear to the shift drive unit 80, if the detected vehicle speed is more than the predetermined value and if the detected turbine revolution speed (Turbine RPM; Nt RPM) is not more than a predetermined value.

Moreover, the shift control unit 70 sends a drive control signal for shifting a speed range from range N to range D to the shift drive unit 80, if the detected throttle valve opening is more than the predetermined value, and if the shift lever is changed from the reverse driving range (range R) to the forward driving range (range D) and the engine revolution state is not an idling state.

Furthermore, the shift control unit 70 sends a drive control signal for shifting into a second gear to the shift drive unit 80, if the detected vehicle speed is more than the predetermined value and the detected turbine revolution speed is more than the predetermined value.

Figure 2:
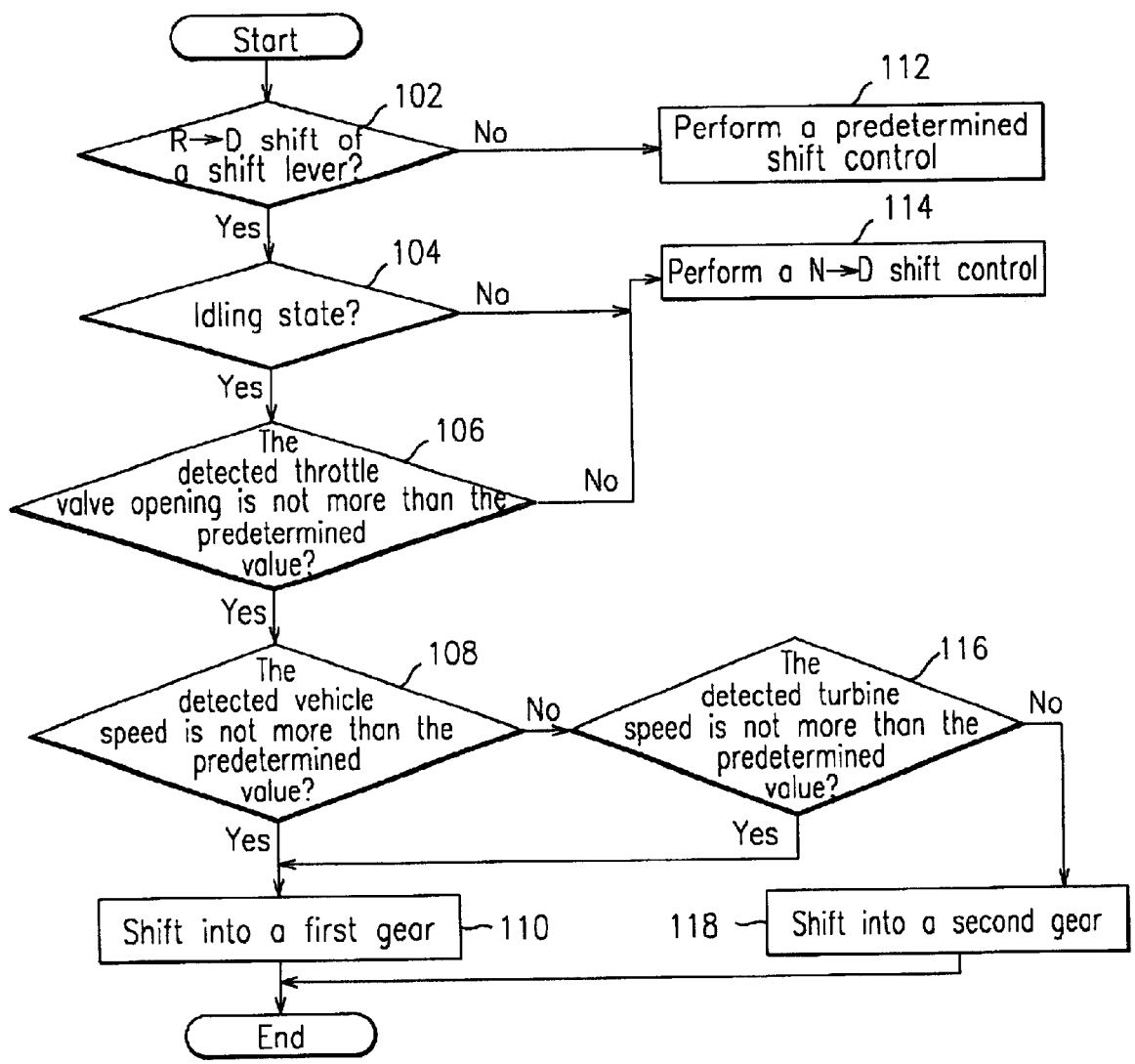
FIG. 2 is a control flowchart showing a shift control method for shifting into a forward driving range while driving in a reverse driving range of an automatic transmission vehicle according to a preferred embodiment of the present invention.

FIG. 2 is a control flowchart showing a shift control method for shifting into a forward driving range while driving in a reverse driving range of an automatic transmission vehicle according to a preferred embodiment of the present invention. Referring to FIG. 1 and FIG. 2, the shift control method of the present invention will hereinafter be described in detail.

Firstly, the shift control unit 70 detects the shift lever position by means of the shift lever position detector 20 at step 102 of FIG. 2, and it proceeds to step 104 if the detected shift lever position at step 102 is changed from range R to range D. The shift control unit 70 detects engine revolution speed by means of the crank angle detector 30 at step 104, and if the engine is idling it proceeds to step 106 where it detects the throttle valve opening by means of the throttle position detector 40. The shift control unit 70 proceeds to step 108 if the detected throttle valve opening at step 106 is not more than a predetermined value, where the vehicle speed detector 50 detects the vehicle speed. Moreover, the shift control unit 70 proceeds to step 110 if the detected vehicle speed at step 108 is not more than the predetermined value and sends a drive control signal for shifting into the first gear to the shift drive unit 80, which performs the control operation for shifting into the first gear.

The shift control unit 70 proceeds to step 112 if the detected shift lever at the above-mentioned step 102 is not shifted from range R to range D and performs a predetermined shift control operation. Moreover, the shift control unit 70 proceeds to step 114 if the detected engine state is not an idling state or the detected throttle valve opening is more than a predetermined value at the above-mentioned steps 104 and 106, and sends an N →D shift drive control signal to the shift drive unit 80, which performs the control operation for shifting from range N to range D.

Furthermore, the shift control unit 70 proceeds to step 116 if the detected vehicle speed at the above-mentioned step 108 is more than the predetermined value, where it detects the turbine shaft revolution speed of the torque converter by means of the turbine speed detector 60. The shift control unit 70 proceeds to step 110 if the detected turbine speed at step 116 is not more than the predetermined value, and it sends a drive control signal for shifting into the first gear to the shift drive unit 80, which performs the control operation for shifting into the first gear.

Contrary to this case, the shift control unit 70 proceeds to step 118 if the detected turbine speed at step 116 is more than the predetermined value, and it sends a drive control signal for shifting into the second gear to the shift drive unit 80, which performs the control operation for shifting into the second gear.

Consequently, a shift control method according to a preferred embodiment of the present invention may perform smooth shifting along the entire vehicle speed range when a shift lever is changed to range D while driving in the range R by using both a vehicle speed signal used in shift control of the prior art and a turbine speed, thereby reducing shift shock.

As described above, a shift control method for shifting into a forward driving range while driving in a reverse driving range of an automatic transmission vehicle according to a preferred embodiment of the present invention may reduce shift shock occurring in changing a shift lever to the forward driving range while driving in the reverse driving range, and improve durability of an automatic transmission by preventing failure of parts.

What is claimed is:

1. A shift control method for selecting a target shift gear of a forward driving range when a shift lever changes from a reverse range to the forward driving range, comprising:

detecting a shift lever position;

detecting an engine revolution;

detecting a throttle valve opening;

detecting a vehicle speed;

detecting a turbine shaft revolution speed of a torque converter; and selecting the target gear of the forward driving range based on at least one of the vehicle speed and the turbine shaft revolution speed, if the shift lever position is changed from the reverse range to the forward driving range, an engine revolution state is an idling state, and the detected throttle valve opening is not more than a first predetermined value, wherein a first gear is selected as the target gear if the vehicle speed is not more than a second predetermined value, and wherein the first gear is selected as the target gear if the vehicle speed is more than the second predetermined value and the turbine speed is not more than a third predetermined value.

2. The method of claim 1, further comprising;

performing a shift control operation for shifting a speed range from a neutral range to the forward driving range, if the shift lever is changed from the reverse driving range to the forward driving range and an engine revolution state is not an idling state, and if the detected throttle valve opening is more than the first predetermined value.

3. The shift control method of claim 1, wherein in said selecting the target gear, a second gear is selected as the target gear if the vehicle speed is more than the second predetermined value and the turbine speed is more than the third predetermined value.

4. A shift control method for shifting into a forward driving range while driving in a reverse driving range of an automatic transmission vehicle, comprising:

detecting a shift lever position of the vehicle;

detecting an engine revolution speed of the vehicle;

detecting a throttle valve opening of the vehicle;

detecting a vehicle spend;

performing a shift control operation for shifting into a first gear if the shift lever is changed from a reverse driving range to a forward driving range and the engine revolution state is an idling state, and if the detected throttle valve opening and vehicle speed, respectively, are not more than predetermined values;

detecting a turbine shaft revolution speed of a torque converter; and performing a shift control operation for shifting into the first near if the detected vehicle speed is more than the predetermined value, and if the detected turbine speed is not more than a predetermined value.

5. The method of claim 4, further comprising;
performing a shift control operation for shifting a speed range from a neutral range to the forward driving range, if the shift lever is changed from the reverse driving range to the forward driving range and an engine revolution state is not an idling state, and if the detected throttle valve opening is more than the predetermined value.

6. The method of claim 4, further comprising:
performing a shift control operation for shifting into a second gear if the detected turbine speed is more than the predetermined value.

* * * * *